United States Patent [19]

Jacobs et al.

[11] 4,220,301

[45] Sep. 2, 1980

[54] FLEXIBLE STRAP TYPE MOUNTING DEVICE

[75] Inventors: Alfred G. Jacobs; Richard L. Seiders, both of Madison, Wis.

[73] Assignee: Safe-T-Gard, Inc., Madison, Wis.

[21] Appl. No.: 36,845

[22] Filed: May 7, 1979

[51] Int. Cl.³ .............................................. F16L 3/08
[52] U.S. Cl. ...................................... 248/74 PB; 2/9; 24/16 PB; 24/73 PB
[58] Field of Search .............. 248/74 R, 74 A, 74 PB, 248/316 D, 68 R; 24/249 R, 255 SL, 256, 257, 16 R, 16 PB, 81 CC, 73 PB; 2/9

[56] References Cited

U.S. PATENT DOCUMENTS

| 2,643,902 | 6/1953 | Stanworth | 24/249 R X |
| 2,655,703 | 10/1953 | Flora | 24/16 R |
| 3,854,146 | 12/1974 | Dunning | 2/9 |
| 3,944,177 | 3/1976 | Yoda | 248/74 A |
| 4,086,664 | 5/1978 | Humphrey | 2/9 |
| 4,132,381 | 1/1979 | McClellan | 248/74 PB |
| 4,149,298 | 4/1979 | Forest | 24/16 PB |

FOREIGN PATENT DOCUMENTS

| 1223125 | 6/1960 | France | 24/16 PB |
| 1052285 | 12/1966 | United Kingdom | 248/74 PB |

*Primary Examiner*—J. Franklin Foss
*Attorney, Agent, or Firm*—Morsbach & Pillote

[57] ABSTRACT

A flexible strap type mounting device formed of one-piece resilient plastic and including a mounting base having an end wall at one end providing an item engaging abutment at one side of the end wall and a keeper flange at the other end of the end wall, a flexible strap integrally joined at one end to the end wall and arranged to form an item retaining loop outwardly of the abutment when the distal end of the strap overlies the keeper flange, and an elongated relatively rigid head integrally joined intermediate its ends to the distal end of the strap and provided with a nose portion at one end engageable with the keeper flange and a lever portion at its other end for moving the head relative to the strap between an open position in which the nose portion extends transverse to the distal end of the strap and a latch position in which the nose portion extends in underlying relation to the distal end of the strap.

10 Claims, 7 Drawing Figures

FLEXIBLE STRAP TYPE MOUNTING DEVICE

BACKGROUND OF THE INVENTION

Various different flexible strap type mounting devices have heretofore been made and used for securing a wide variety of items to a support. For example, flexible strap type mounting devices have been used for attaching cables and pipes to a support and have also been used for attaching grid type face masks to a helmet, for example as shown in U.S. Pat. Nos. 3,263,236 and 4,086,664. Some of the flexible strap type mounting devices, such as shown in the aforementioned U.S. Pat. Nos. 3,263,236 and 4,086,664, mount the devices on a support by extending a fastener through both end portions of the strap and into or through the support to secure both ends of the strap to the support. Since the fasteners extend through both ends of the strap of the mounting device, the fastener cannot be finally installed until after the item is positioned in the strap and, conversely, the fastener must be removed or the strap severed in order to release the item from the strap. Some other flexible strap type mounting devices, for example as shown in U.S. Pat. Nos. 3,262,663; 3,516,631; 3,529,795 and 3,758,060, provide a base at one end of the flexible strap which is adapted for attachment to a support, and a latch means on the distal end of the strap for securing the distal end of the strap to the base after the base is attached to a support. In some installations, for example when clamping a loose bunch of wires or when clamping a relatively rigid pipe or item such as a face mask that is slightly out of position with respect to the mounting device, it is desirable to be able to tension the strap during the latching operation in order to either compress the item or draw the item into proper position during the clamping operation. In general, the prior flexible strap type mounting devices with which the applicants are familiar, utilize only snap-in type latches for securing the distal end of the strap to the base and are not adapted for applying substantial tension to the strap during latching of the distal end of the strap to the base.

SUMMARY OF THE INVENTION

It is an object of the present invention to overcome the disadvantages of the prior art by providing a flexible strap type mounting device in which the flexible strap can be subjected to substantial tension during latching of the distal end of the strap to the mounting base.

Another object of the present invention is to provide a flexible strap type mounting device which will securely retain the item against forces applied in widely different directions.

Still another object of the invention is to provide a flexible strap type mounting device in which the fastener for attaching the mounting base to a support is protectively enclosed when the head on the distal end of the strap is latched to the base.

Accordingly, the present invention provides a flexible strap type mounting device for attaching an item to a support, the mounting device being molded of one-piece resilient plastic material and comprising a mounting base adapted for attachment to a support, end wall means at one end of the mounting base providing an abutment at one side of the end wall means for engagement with the item and a keeper flange at the other side of the end wall means spaced from the mounting base and extending away from the abutment, an elongaged flexible strap having one end integrally joined to the base and arranged to form an item retaining loop outwardly of the abutment when the distal end of the strap overlies the keeper flange, a head integrally joined with the distal end of the strap and being thicker and more rigid than the strap to be flexibly movable as a unit relative to the strap, one end portion of the head being shaped to provide a nose extending from the distal end of the strap and in underlying relation thereto to form a reverse hook at the inner side of the strap for engagement with the keeper flange, the other end portion of the head extending from the distal end of the strap in a direction away from the nose portion, the strap being sufficiently flexible to allow flexing movement of the head relative to the strap between an open position in which the nose extends generally transverse to the distal end of the strap to facilitate movement of the nose past the keeper flange and a latch position in which the nose extends from the distal end of the strap in underlying relation with the strap to engage the keeper flange on the base when the distal end of the strap overlies the keeper flange and the head is positioned alongside the base.

A second latch mechanism is also advantageously provided for engaging the other portion of the head to hold the head in its latched position. The base is advantageously provided with upstanding side walls to laterally confine the head in its latched position.

These, together with other objects, features and advantages of the present invention will be more readily understood by reference to the following detailed description, when taken in connection with the accompanying drawings wherein.

The flexible strap type mounting device of the present invention is generally adapted for use in attaching items to a support and may, for example, be used for attaching elongated items such as pipes, cables, and wires, it being understood that the size of the mounting device and length of the strap is selected in accordance with the size or cross-section of the elongated item to be mounted. The flexible strap type mounting device of the present invention is considered to have some features which are particularly advantageous for use in mounting wire or grid type face masks to a helmet, and the invention is herein specifically illustrated and described in such an application.

Figure 7:
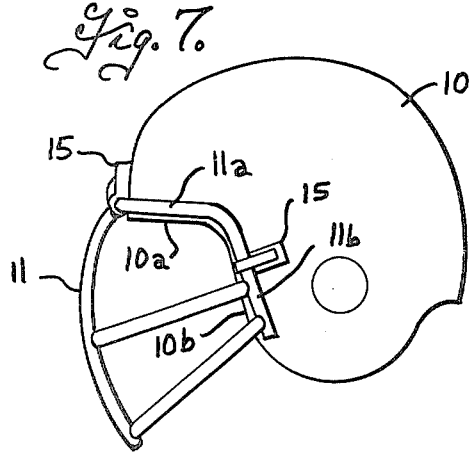
FIG. 7 is a side elevational view of a football helmet and face mask illustrating use of the flexible strap type mounting devices for securing the face mask to the helmet.

Referring now more particularly to FIG. 7 of the drawings there is illustrated a helmet 10 which may, for example, be a football helmet, hockey helmet or the like, having a face opening at its forward side defined by an upper edge 10a extending across the front of the helmet and side edges 10b extending downwardly at the sides of the helmet. A face guard or mask 11 extends across a face opening and may, for example, be formed of wire, tubular stock or of a cast open-grid construction. In the form shown, the face mask 11 has an upper mounting portion 11a that extends across the front of the helmet adjacent the upper edge 10a of the face opening and side mounting portions 11b that extend downwardly along the sides of the helmet. Flexible strap type mounting devices 15 are herein shown attached to the top insides of the helmet for engagement with the upper and side mounting portions 11a and 11b of the face mask to attach the face mask to the helmet.

Figure 2:
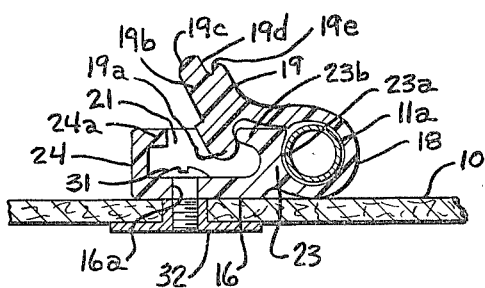
FIG. 2 is a vertical sectional view through the flexible strap type mounting device illustrating an intermediate step in closing the strap type mounting device around an item to be clamped.
Figure 4:
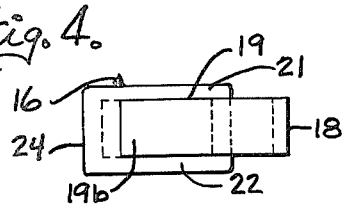
FIG. 4 is a top plan view of the flexible strap mounting device in a closed position.
Figure 3:
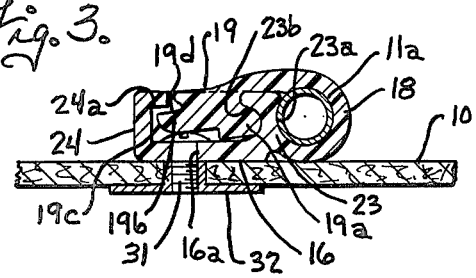
FIG. 3 is a fragmentary vertical sectional view through the flexible strap type mounting device in its closed position.
Figure 5:
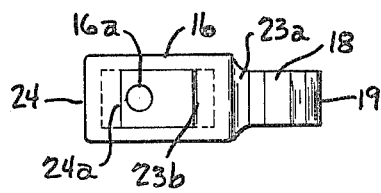
FIG. 5 is a top plan view of the flexible strap type mounting device in its open position.
Figure 6:
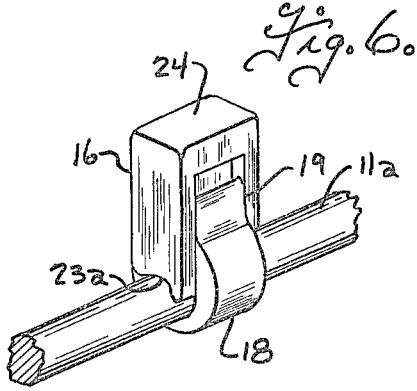
FIG. 6 is a perspective view of the flexible strap type mounting device in its closed position.

The flexible strap type mounting devices 15 are molded of one-piece resilient polymeric material for example, nylon, polyethylene, polypropylene or the like and includes a mounting base 16 adapted for attachment to a support such as the helmet 10, a flexible strap portion 18 integrally joined at one end to the mounting base and having a head 19 at the distal end of the strap adapted to interlock with the mounting base. The mounting base 16 preferably has a generally rectangular configuration and side walls 21, 22 and end walls 23, 24 extend from one side of the base and define a cavity 25. One of the end walls 23 is shaped to provide an abutment 23a at the outer side of the cavity for engagement with the item to be mounted and, as shown, is formed with an arcuate configuration generally conforming to the mounting portion 11a of face mask 11. The flexible strap 18 is integrally joined to the end wall 23 adjacent the base 16 and the flexible strap is dimensioned to form an item retaining loop outwardly of the abutment 23a, when the distal end of the strap overlies the end wall 23, as best shown in FIGS. 2, 3 and 6. The end wall 23 also has a keeper flange 23b at the inner side of the cavity, which keeper flange is spaced above the base 16 and extends from the wall 23 in a direction away from the abutment 23a. The head 19 comprises an elongated body which is integrally joined intermediate the ends to the distal end of the strap and which is thicker and more rigid than the strap so as to be flexibly movable as a unit relative to the strap. The one end portion of the head 19 is shaped to provide a nose 19a which extends from the distal end of the strap in underlying relation thereto to form a reverse hook at the inner side of the strap for engagement with the keeper flange. The other end portion 19b of the head extends from the distal end of the strap in a direction away from the nose 19a. The nose 19a of the head is adapted to engage and hook on the keeper flange 23b when the distal end of the strap overlies the end wall 23a and the strap is made sufficiently flexible to allow flexing movement of the head relatively to the strap between an open position somewhat as shown in FIG. 2 in which the nose 19a extends generally transverse to the distal end of the strap, to thereby facilitate movement of the nose past the keeper flange 23b. The strap 18 is preferably dimensioned so that it only loosely extends around the item 11a to be clamped when the head is positioned as shown in FIG. 2. As the head is thereafter moved relative to the distal end of the strap from the position shown in FIG. 2 to the latch position shown in FIG. 3, it pulls on the distal end of the strap and draws the strap into tight engagement with the item 11 and forces the item 11 against the abutment face 23a on the end wall 23. Thus, the elongated relatively rigid head provides a lever action which aids in drawing the strap snugly around the item to be clamped. This facilitates clamping of the head to the base since the strap can be relatively loose around the item 11 when the nose portion initially moves into a position at the edge of the retainer flange as shown in FIG. 2. Further, the mounting device can accommodate some misalignment or mispositioning of the item 11 relative to the abutment face, and can still operate to draw the item 11 into firm engagement with the abutment face. This is also advantageous when clamping relatively loose items such as a group of wires.

Figure 1:
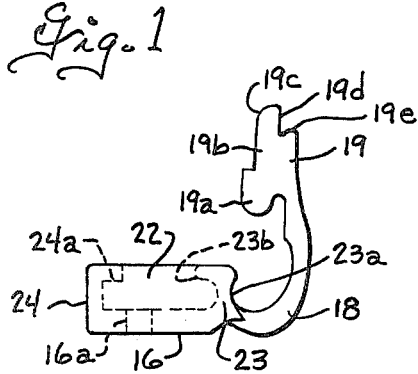
FIG. 1 is a side elevational view of the flexible strap type mounting device shown in an open position.

The mounting device is advantageously molded so that the head is normally disposed relative to the strap as shown in FIG. 1 so that the nose 19a forms a reverse hook at the distal end of the strap. The head can then be manually manipulated by grasping the end portion 19b of the head between the thumb and forefinger of one hand to flex or move the head relative to the strap to its open position as shown in FIG. 2 in which the nose 19a extends in a direction transverse to the distal end of the strap. Thereafter, when the head is moved to its latch position as shown in FIG. 3, it will tend to return to its normal position relative to the distal end of the strap as shown in FIG. 3, so as to tend to hold the head in its latch position. A further means is provided for engaging the end portion 19b of the head to aid in retaining the head in its latch position. As shown, the other end wall 24 has a retainer flange 24a spaced above the base and extending inwardly of the cavity 25. The other end portion 19b of the head has a cam surface 19c at the end remote from the nose 19a, and which cam surface is engageable with the retainer flange 24a to force the head toward the end wall 23, and thereby aid in holding the nose 19a in position under the keeper flange 23b. The head 19 also has a shoulder 19d that is adapted to move past the retainer flange 24a and into underlying relation therewith when the head is in its latch position as shown in FIG. 3. As will be seen, the head has a width slightly less than the spacing between the side walls 21, 22 and is receivable therebetween when it is moved into its latch position shown in FIG. 3. The head is thus laterally confined in the cavity.

The base 16 is provided with a mounting opening 16a for receiving a fastener for attaching it to a support. In the embodiment shown, the support comprises a portion of the helmet 10 and the mounting device is attached to the helmet by a headed screw 31 threaded into a T-nut 32 on the helmet. Thus, the head on the fastener is recessed in the cavity 25 and, when the head 19 is in its latch position shown in FIG. 3, it overlies the headed fastener to protectively enclose the same.

From the foregoing it is thought that the construction and operation of the flexible strap type mounting device will be readily understood. The base 16 of the mounting device is attached to the support 17 at the location where it is desired to clamp the item to the support. The item 11 can then be positioned in the strap 18 alongside the abutment 23a when the mounting device is in its open condition as shown in FIG. 1, and the strap thereafter moved to a position in which its distal end overlies the keeper flange 23b with the strap loosely encircling the item 11. The lever portion 19b of the head is then manipulated, as between the thumb and forefinger of the user, to flex the head relatively to the strap to an open position as shown in FIG. 2 in which the nose portion 19a extends generally transverse to the distal end of the strap so that the nose portion can be moved crosswise of the inner edge of the keeper flange 23b. Thereafter, the other end portion 19b of the head is pressed downwardly into the cavity to a position adjacent the base and the head provides a lever action which draws the strap snugly around the item 11 and forces the item against the abutment face 23a to firmly clamp the item to the base. As the head is moved into its latch position, the cam face 19c engages the retainer flange 24a to force the head forwardly until the shoulder 19d on the head underlies the retainer flange as shown in FIG. 3. The head is then firmly locked on the base, but can be removed by insertion of a tool such as a screwdriver between the end of the end portion 19b on the head and the retainer flange, to force the end portion 19b upwardly. The head is conveniently undercut as indicated at 19e to facilitate insertion of a tool to lift the end portion 19b of the head.

The flexible strap type mounting device will firmly secure the item 11 to the support against forces applied in widely different directions on the item. As will be seen from FIG. 3, force components directed downwardly as viewed in FIG. 3 will be transmitted directly to the support 10 and force components directed to the left as viewed in FIG. 3 will be transmitted directly to the abutment face 23a on the end wall. Force components directed either to the right or upwardly as viewed in FIG. 3 are transmitted through the strap 18 and through the head 19 to the keeper flange 23b on end wall 23. The side walls 21, 22 not only protectively enclose the head when in its latched position, but also reinforce and regidify the end walls 23, 24 relative to the base 16.

The embodiments of the invention in which an exclusive property or privilege is claimed are defined as follows:

1. A flexible strap type mounting device for attaching an item to a support, said mounting device being molded of one-piece resilient polymeric material and comprising, a mounting base adapted for attachment to a support, end wall means at one end of the mounting base providing an abutment at one side of the end wall means for engagement with the item and a keeper flange at the other side of the end wall means spaced from the mounting base and extending away from said abutment, an elongated flexible strap having one end integrally joined to said one end of the base and arranged to form an item retaining loop outwardly of said abutment when the distal end of the strap overlies keeper flange, an elongated head integrally joined to said distal end of the strap and being thicker and more rigid than said strap to be flexibly movable as a unit relative to the strap, one end portion of the head being shaped to provide a nose extending from the distal end of the strap and in underlying relation thereto to form a reverse hook at the inner side of the strap for engagement with the keeper flange, the other end portion of the head extending from the distal end of the strap in a direction away from said nose, said strap being sufficiently flexible to allow flexing movement of the head relative to the strap between an open position in which said nose extends generally transverse to said distal end of the strap to facilitate movement of the nose past the keeper flange and a latch position in which the nose extends from the distal end of said strap in underlying relation with the strap to engage the keeper flange on the base when the distal end of the strap overlies the keeper flange and the head is positioned alongside the base.

2. A flexible strap type mounting device according to claim 1 including means on said base engageable with the other end portion of said head for latching said other end portion of the head to said base when the head is moved to a position alongside the base with its nose engaging the keeper flange.

3. A flexible strap type mounting device according to claim 1 including abutment means on the base spaced from the keeper flange and cam means on the other end portion of the head engageable with said abutment means to force the head toward said keeper flange when the head is moved into a position alongside said base.

4. A flexible strap type mounting device according to claim 1 including a retainer flange on said base spaced from said keeper flange, cam means on said other end portion of the head and engageable with said retainer flange to force the head toward said end wall means as the head is moved into a position alongside said base, said head having a shoulder on said other end portion adapted to underlie said retainer flange when the head is in a position alongside said base.

5. A flexible strap type mounting device according to claim 1 including spaced side walls on said mounting base joined to said end wall means and disposed along opposite sides of said head when the latter is in a position alongside said base.

6. A flexible strap type mounting device according to claim 5 including a retainer flange extending between said spaced side walls and spaced from said keeper flange, and cam means on said head spaced from said nose and engageable with said retainer flange to cam the head toward said end wall means as the head is moved into a position alongside the base.

7. A flexible strap type mounting device according to claim 5 wherein said head has a shoulder on said other end portion thereof adapted to underlie said retainer flange when the head is in a position alongside said base.

8. A flexible strap type mounting device for attaching an item to a support, the mounting device being molded of one-piece resilient polymeric material and comprising, a mounting base adapted for attachment to a support and having spaced side and end wall means at one side thereof defining a cavity, one of said end wall means providing an abutment at the outer side of the cavity for engagement with the item and a keeper flange at the inner side of the cavity spaced from the base, an elongated flexible strap having one end integrally joined to said one end wall means and arranged to form an item retaining loop outwardly of said abutment when the distal end of the strap overlies the keeper flange, an elongated head integrally joined intermediate its ends to the distal end of the strap, said elongated head being thicker and more rigid than said strap to be flexibly movable as a unit relative to said strap, said head having a width to be receivable between said side walls and a nose at one end portion engageable with said keeper flange, when the elongated head is moved to a latch position overlying the mounting base, and cam means on the other end portion of said head engageable with the other end wall means for forcing the head toward said one end wall means as the head is moved into its latch position.

9. A flexible strap type mounting device according to claim 8 wherein said other end wall means has a retainer flange extending inwardly of said cavity and spaced from said base, said head having a shoulder at said other end portion thereof engageable with said retainer flange when the head is in latch position.

10. A flexible strap type mounting device according to claim 7 wherein said base has a fastener receiving opening therethrough, fastener means overlying said base and extending through said fastener receiving opening for attaching the base to a support, said head overlying said fastener means when the head is in its latch position.

* * * * *